United States Patent [19]

Fogelberg

[11] 4,184,575

[45] Jan. 22, 1980

[54] TORQUE TRANSFER MECHANISM
[75] Inventor: Mark J. Fogelberg, Muncie, Ind.
[73] Assignee: Borg-Warner Corporation, Chicago, Ill.
[21] Appl. No.: 791,620
[22] Filed: Apr. 27, 1977
[51] Int. Cl.$^2$ .............................................. F16D 43/04
[52] U.S. Cl. ....................................... 192/36; 192/44; 180/253
[58] Field of Search ....................... 192/35, 38, 36, 44, 192/109 R, 109 B; 180/44 R, 49

[56]  References Cited
U.S. PATENT DOCUMENTS

| 3,463,279 | 4/1969 | Breisch | 192/35 |
| 3,481,436 | 12/1969 | Wilkowski | 192/88 |
| 4,018,317 | 4/1977 | Lemon | 180/44 R |
| 4,047,601 | 9/1977 | Fogelberg | 180/44 R |
| 4,083,419 | 4/1978 | Fogelberg | 180/44 R |

Primary Examiner—Samuel Scott
Assistant Examiner—G. A. Anderson
Attorney, Agent, or Firm—Julian Schachner

[57]  ABSTRACT

A power transfer mechanism incorporated in a multiple path drive system comprises a transfer case disposed between a source of input torque and a pair of drive axles. Torque is transferred directly to the fixed axle and is transferred automatically to the steering axle through a double-acting overrunning clutch when required. The clutch is biased toward one engaged position and is prevented from locking inadvertently in the other engaged position by a cam operated blocking device. The device also assists in biasing the clutch.

10 Claims, 8 Drawing Figures

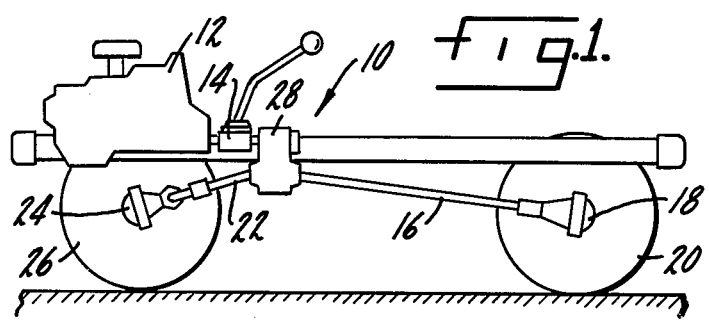
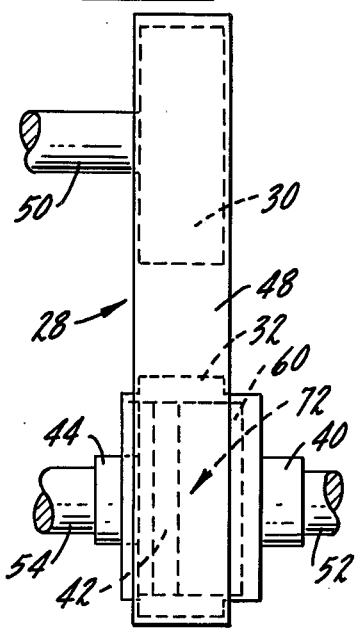
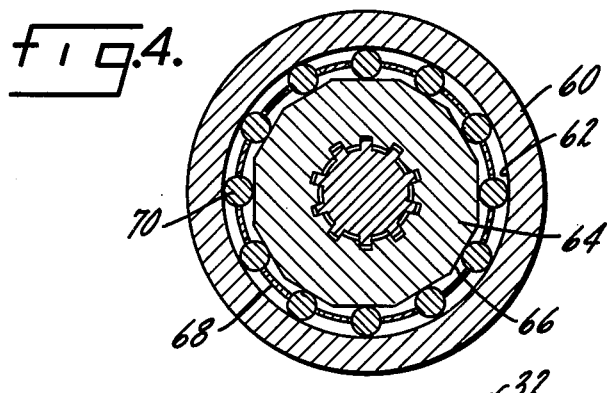
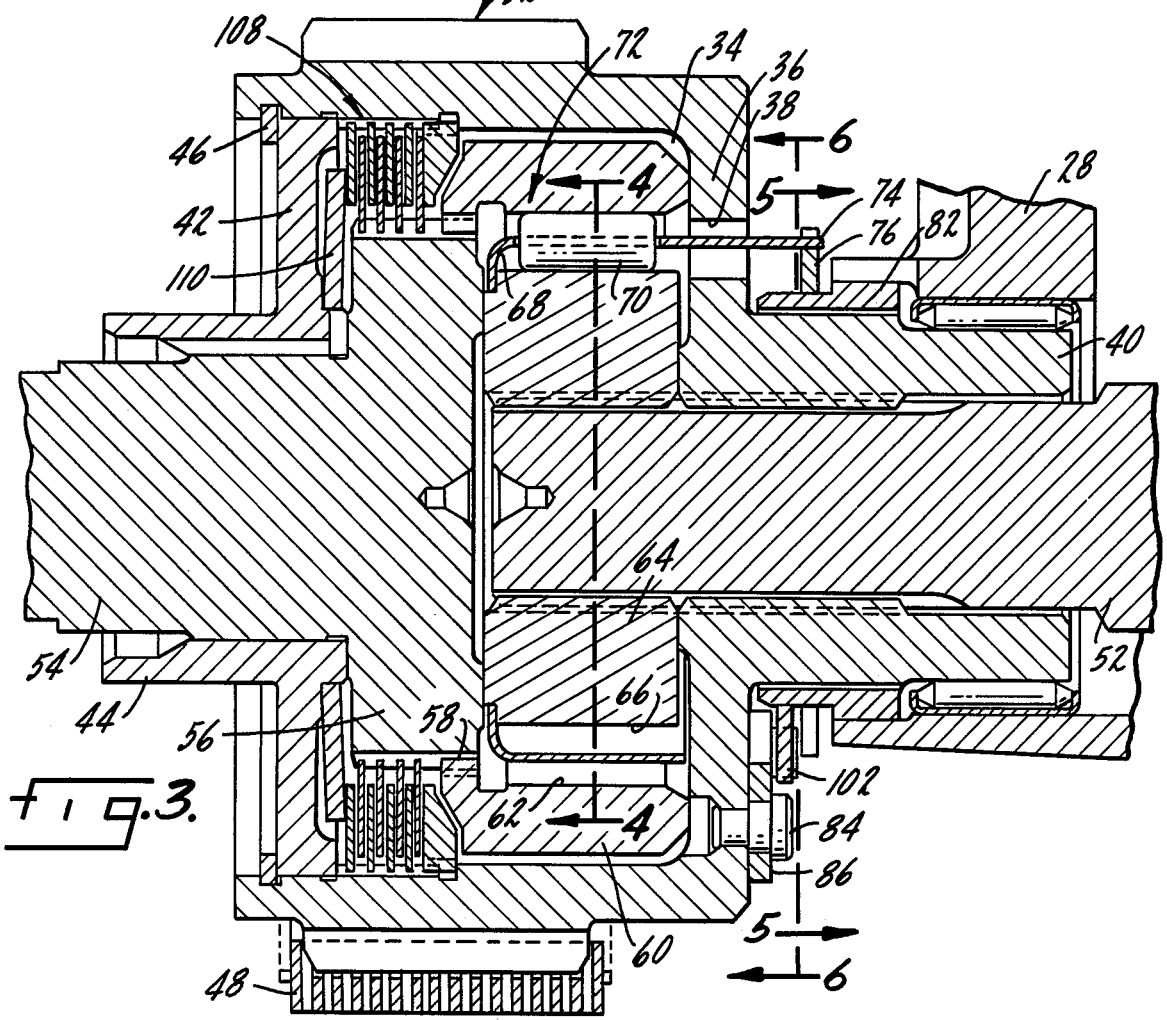

TORQUE TRANSFER MECHANISM

BACKGROUND OF THE INVENTION

This invention relates generally to a power transfer mechanism adapted to be incorporated in a multiple path drive system, for example a four-wheel drive vehicle. More particularly, it relates to a torque transfer case adapted to receive torque from a prime mover and to provide torque for one drive axle when two-wheel drive is adequate and to provide torque for both drive axles automatically when four-wheel drive is required. The torque transfer case incorporates a double-acting overrunning clutch for automatically engaging and disengaging the four-wheel drive function.

In recent years there have been many improvements in automotive drive trains, including improvements relating to the transfer of torque from a prime mover to drive axles. Where four-wheel drive systems are used, transfer cases have been developed which direct torque to one output to drive a fixed axle and through an overrunning clutch to another output for driving a steering axle. One such transfer case is disclosed in U.S. Pat. No. 3,993,152 issued Nov. 23, 1976, wherein an overrunning clutch automatically engages and disengages the four-wheel drive function. However, an excessive overrunning condition may cause undesirable clutch lockup, thus negating its automatic function. One attempt at a solution to this problem was the use of a speed-sensitive blocking structure, as dislcosed in U.S. Pat. No. 4,044,870 issued Aug. 30, 1977. It then was found that an excessive overrunning condition may obtain at speeds below the threshold speed of such a structure. Thus, there was still a need to provide an overrunning clutch which engages and disengages automatically, but which prevents undesirable engagement even at low speeds. This need is believed to have been met by a blocking structure which is direction-sensitive rather than speed-sensitive. Such a direction-sensitive blocking structure is disclosed in U.S. Pat. No. 4,047,601 issued Sept. 13, 1977 and 4,083,419 issued Apr. 11, 1978.

The direction-sensitive blocking structure includes a drag ring and a blocking element which develop opposing frictional forces continuously during operation. As a result, the operating characteristics of the mechanism are not such as to provide efficient energy utilization.

SUMMARY OF THE INVENTION

This invention is directed to an improved four wheel drive system including a transfer case of the type having an overrunning clutch therein which includes means to improve the aforementioned inefficient operating characteristics. The transfer case is adaptable for transferring torque from an input directly to fixed (herein called rear) axle wheels and through the overrunning clutch to steering (herein called front) axle wheels. When the rear wheels lose traction in either direction of rotation, the overrunning clutch effectively engages and torque is transferred to both axles, thereby establishing a four-wheel drive condition. When traction is restored to the rear wheels, the overrunning clutch effectively disengages and the system reverts back to a two-wheel drive condition.

The transfer case includes a front output incorporating an outer clutch race of cylindrical configuration. A rear output incorporates an inner clutch race having a plurality of ramp surfaces, each associated with a roller carried by a roller cage. Frictional bias for the roller cage is provided by a drag ring rotatable with the roller cage and adapted for frictional engagement with the transfer case housing.

With a double-acting overrunning roller clutch incorporated in the system, it is desirable to guard against undesirable clutch engagement. This is accomplished by a cam operated blocking device which prevents undesirable roller movement through the central or freewheel position. The device is frictionally biased by a drag ring adapted for frictional engagement with the transfer case housing. Upon movement of the vehicle, a drag force is developed which cams an element of the device into a position preventing undesirable movement of the cage and its associated rollers across the central position. Subsequently, the drag force exerted by the drag ring increases the frictional bias for the roller cage.

The relationship of the element and drag ring is such that there is lost motion therebetween. In the event torque is applied during direction reversals with the vehicle stopped, this relationship insures that the cage and its associated rollers are in their proper position, thus preventing undesirable clutch engagement. The device is direction sensitive and operates in either direction of rotation, without regard to the speed of rotation.

Thus, the requirements of various vehicle manufacturers for improved automatic four-wheel drive power trains may be satisfied with a simplified and economical assembly, as will be described.

BRIEF DESCRIPTION OF THE DRAWINGS

The objects and advantages of this invention will become apparent to those skilled in the art upon careful consideration of the specification herein, including the drawings, wherein:

FIG. 1 is a schematic view of the four-wheel drive vehicle;

FIG. 2 is a schematic view of the torque transfer case;

FIG. 3 is a sectional view showing details of the double-acting overrunning clutch incorporated in the torque transfer case;

FIG. 4 is a reduced sectional view taken along the line 4—4 of FIG. 3 showing additional details of the double-acting overrunning clutch;

Figure 5:
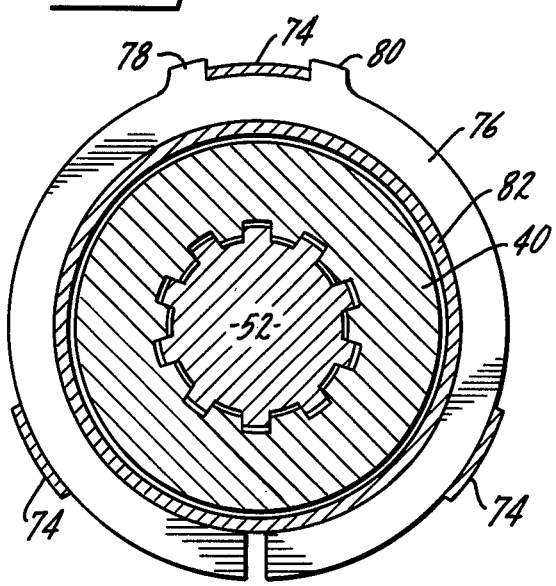
FIG. 5 is a sectional view taken along the line 5—5 of FIG. 3 showing details of the biasing structure.

While this invention is susceptible of embodiment in many different forms, there is shown in the drawings and herein will be described in detail a preferred embodiment. It should be understood that the present disclosure is considered to be an exemplification of the principles of the invention and is not intended to limit the invention to this embodiment.

DESCRIPTION OF THE PREFERRED EMBODIMENT

Referring now to the drawings in greater detail, there is shown generally in FIG. 1 a multiple path drive system in the form of a four-wheel drive vehicle 10 having a prime mover 12 in driving relationship with a suitable transmission 14. A propeller shaft 16 is in driving engagement with a rear axle assembly 18, which in turn supports a pair of ground-engaging wheels 20. Another propeller shaft 22 is in driving engagement with a front axle assembly 24, which in turn supports a pair of ground-engaging wheels 26. A torque transfer case 28 is in engagement with transmission 14 for receiving torque from prime mover 12, and is in engagement with propeller shafts 16 and 22 respectively for transmitting torque to ground-engaging wheels 20 and 26.

As shown in FIGS. 2, 3 and 4, transfer case 28 includes a first sprocket 30 and a second sprocket 32. Sprocket 32 defines an interior pocket 34 and includes a flange 36 which in turn defines a plurality of openings 38 extending therethrough and spaced around its periphery to communicate pocket 34 with the exterior thereof. Sprocket 32 also includes an annular extension 40 extending outwardly from flange 36. Also forming a portion of sprocket 32 is a flange 42 having an annular extension 44 extending outwardly therefrom. Flange 42 is secured to sprocket 32 by means of a locking ring 46 or the like. A suitable chain 48 couples sprockets 30 and 32. Sprocket 30, chain 48 and sprocket 32 form a chain drive train.

An input shaft 50 extends into transfer case 28 and is engaged with sprocket 30. Input shaft 50 is adapted to receive torque, for example, from associated manual or automatic transmission 14 of automotive vehicle 10. It should be understood that input shaft 50 may be the output shaft of such a transmission.

A rear output shaft 52 is engaged with propeller shaft 16 and extends into transfer case 28. As disclosed in the aforementioned U.S. Pat. No. 3,993,152, output shaft 52 may be engaged with sprocket 30 to provide straight through drive from input shaft 50 to propeller shaft 16, or may be engaged with sprocket 32 to provide offset drive from input shaft 50 to propeller shaft 16. In the embodiment shown herein, output shaft 52 is splined to extension 40 of sprocket 32.

A front output shaft 54 is engaged with propeller shaft 22 and extends into transfer case 28. Output shaft 54 defines an upstanding flange 56 which is engaged by means of a loose spline connection 58 with an annular extension 60 within pocket 34 of sprocket 32. Extension 60 defines an outer clutch race 62 of cylindrical configuration.

An annular element or cam 64 is splined to ouput shaft 52. Cam 64 is within pocket 34 and defines an inner clutch race 66 comprising a plurality of flats or ramp surfaces.

Wedging means includes an annular cage 68 supporting a plurality of wedging elements 70, one of which is associated with each flat of inner race 66. Extension 60, cam 64, races 62 and 66, cage 68 and wedging elements 70 comprise together a double-acting overrunning clutch or freewheel device 72. In one preferred from of the invention, wedging elements 70 are rollers, and clutch 72 is a roller clutch.

As shown in FIGS. 3 and 5, roller cage 68 defines plurality of fingers 74 extending through openings 38 of sprocket 32. A drag ring 76 defines a pair of spaced projections 78 and 80 for engagement by a finger 74 such that drag ring 76 is rotated with fingers 74 as roller cage 68 rotates. A wear ring 82 is press-fit to the housing of transfer case 28 for frictional contact by drag ring 76, so as to establish smooth frictional engagement therewith. As a result, balanced radial forces are developed which cause a relative drag effect on roller cage 68.

Figure 6:
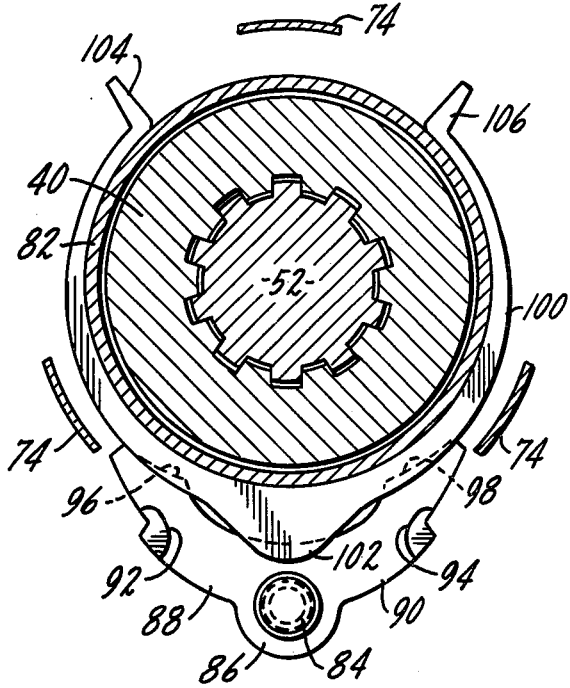
FIG. 6 is a sectional view taken along the line 6—6 of FIG. 3 showing details of the blocking structure.

Turning now to FIGS. 3 and 6, the direction-sensitive blocking mechanism includes a pin 84 secured to flange 36 of sprocket 32, and a rocker element 86 pivotally supported by pin 84. Element 86 includes a pair of arms 88 and 90. Arms 88 and 90 respectively define cam followers 92 and 94 as well as inner surfaces 96 and 98. A drag ring 100 defines a cam 102 and a pair of tabs 104 and 106 spaced from an adjacent finger 74 of roller cage 68. Drag ring 100 is in frictional contact with wear ring 82, so as to establish smooth frictional engagement with the housing of transfer case 28. In one preferred form of the invention, there is a gap between cam 102 and each cam follower 92 and 94 which, in effect, develops a lost motion connection therebetween.

A drive-back mechanism is shown in FIG. 3 in the form of a friction clutch 108 interposed between flange 56 of output shaft 54 and sprocket 32. A belleville spring 110 applies an axially directed biasing force tending to engage friction clutch 108. This results in the establishment of a friction drive path between output shafts 52 and 54, which drive path is in parallel with but separate from the drive path established through clutch 72. Such a drive path keeps the rear wheels rolling in the coast mode of operation, so as to overcome any tendency of the rear wheels to skid.

In operation, torque is received by input shaft 50 and is transferred through the chain drive train to drive output shaft 52. Output shaft 52 is connected through propeller shaft 16 to drive fixed rear axle assembly 18 and its associated wheels 20. Output shaft 54 is connected through propeller shaft 22 to drive steerable front axle assembly 24 and its associated wheels 26.

Extension 60 need not overrun cam 64 in order for clutch 72 to be effective, as clutch 72 is a freewheel device. It should be understood, however, that in one preferred form of the invention overrun may be built into clutch 72. Where output shaft 52 is engaged with sprocket 30, overrun may be built into the chain drive train and a stub shaft, for example, may connect extension 40 and cam 64. Where output shaft 52 is engaged with sprocket 32, as shown in FIGS. 2 and 3, this may be accomplished by having slightly different axle ratios, front wheels slightly smaller than rear wheels, or by inflating the front tires to a pressure slightly less than that in the rear tires. Other suitable means may be provided for causing extension 60 to overrun cam 64. In any event, extension 60 inherently rotates faster than cam 64 when the vehicle is turning, since the front wheels travel through a larger radius than do the rear wheels. Even when moving in a straight path there is a slight tendency of the vehicle to deviate due to road irregularities or the like, for which the operator must compensate.

With reference to FIG. 4, assume output shaft 52 and cam 64 are rotating in the clockwise direction. Output shaft 54 and extension 60 also rotate in the clockwise direction, but tend to overrun. The drag effect on roller cage 68, developed by the frictional engagement of drag ring 76 with wear ring 82, causes rollers 70, in effect, to rotate relatively in the counterclockwise direction. Rollers 70 tend to wedge between inner race 66 and outer race 62 so as to engage clutch 72. However, due to the fact that extension 60 tends to overrun cam 64, a force is developed which acts on rollers 70 such that they will tend to be carried in the clockwise direction, relatively, away from their engaged position. This effectively prevents engagement of clutch 72. As a result, torque is transferred to output shaft 52 but not to output shaft 54.

In this condition, the operation is essentially that of a conventional two-wheel drive vehicle.

When the rear wheels lose traction, output shaft 52 will speed up. The drag effect on roller cage 68 will cause rollers 70 effectively to wedge between inner race 66 and outer race 62. When this takes place, torque will be transferred both to output shaft 52 and through clutch 72 to output shaft 54. In this condition, the operation is essentially that of a conventional four-wheel drive vehicle in locked-up mode.

When the rear wheels regain traction, output shaft 52 will slow down, and output shaft 54 again will tend to overrun output shaft 52, thereby effectively disengaging clutch 72 and restoring the vehicle to the two-wheel drive condition. Thus, it will be seen that the transfer case provides for establishment of four-wheel drive automatically, as required, and for establishment of two-wheel drive automatically when four-wheel drive is not required. This automatic engaging and disengaging feature is provided when the vehicle is moving in either the forward or reverse directions; that is, when output shafts 52 and 54 are rotating in either the clockwise or counterclockwise directions as shown in FIG. 4.

Relative rotation between extension 60 and cam 64, with extension 60 overspeeding, prevents clutch 72 from engaging by causing rollers 70 to move slightly, relatively, away from a wedging position on clutch races 62 and 66. This results in slight rotational displacement of cage 68 toward the central position.

Excessive overspeed of extension 60 could pull cage 68 and rollers 70 beyond the central position into a clutch engaging position on the opposite side of cam 64. This may occur as a result of shocks to the driveline, or unusual operating conditions such as, for example, a tire blowout. In particular, a front tire blowout would cause the rolling radius of that wheel to become suddenly reduced. Such changes in the characteristics of a vehicle driveline would generate shocks which could cause instantaneous excessive overspeed sufficient to pull the rollers beyond the freewheel position toward clutch engagement on the opposite side of the cam. While enough friction on the cage to prevent this could be built into the system, the amount required would be wasteful of power and could lead to excessive wear under normal operating conditions.

The direction-sensitive blocking mechanism disclosed herein prevents such inadvertent movement of rollers 70, and is operable independently of speed. Initial vehicle movement causes rotation of sprocket 32 to drive output shaft 52 and cam 64. Pin 84, secured to flange 36 of sprocket 32, rotates therewith and with cam 64. Element 86 is carried with pin 84. After a slight delay determined by the lost motion connection between cam followers 92 and 94 and cam 102, one of the cam followers will contact the cam. Element 86 will be displaced to the position shown in either FIG. 7 or FIG. 8, depending on the direction of vehicle movement. Either of surfaces 96 or 98 is spaced from wear ring 82, and thus there is essentially no friction developed between element 86 and drag ring 100 once element 86 has been cammed into the blocking positions of FIG. 7 or 8. In the event of a shock resulting in excessive camming force, pivotal movement of element 86 about pin 84 out of its blocking position is prevented by contact of either surface 96 or 98 with wear ring 82. Such contact should be of momentary duration and thus should develop little or no friction.

The blocking mechanism is designed such that when element 86 is cammed into its blocking position, rotation of roller cage 68 is sufficient to cause a finger 74 to abut one of tabs 104 or 106. Drag ring 100 is carried with roller cage 68, and friction developed between drag ring 100 and wear ring 82 reinforces the bias on roller cage 68 developed by drag ring 76.

The profile of cam 102 is such that a mechanical advantage develops high actuating forces for camming element 86 for a given rotation, as compared with the actuating forces developed using prior mechanisms.

Figure 7:
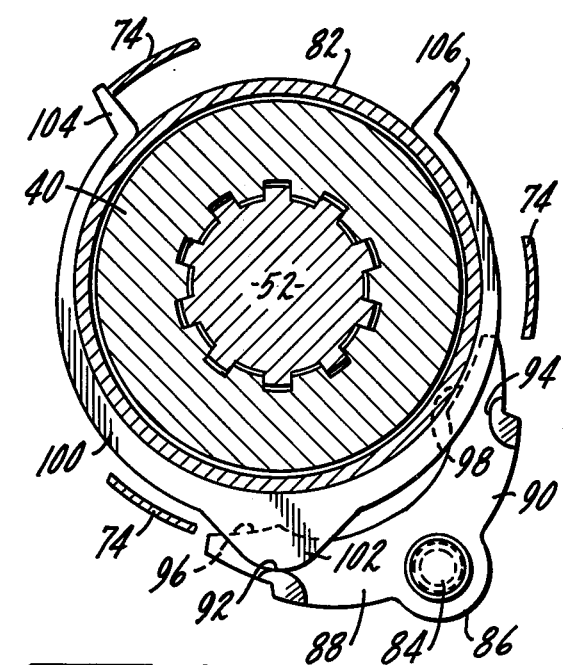
FIG. 7 is a view similar to FIG. 6 showing the blocking structure in one blocking position.
Figure 8:
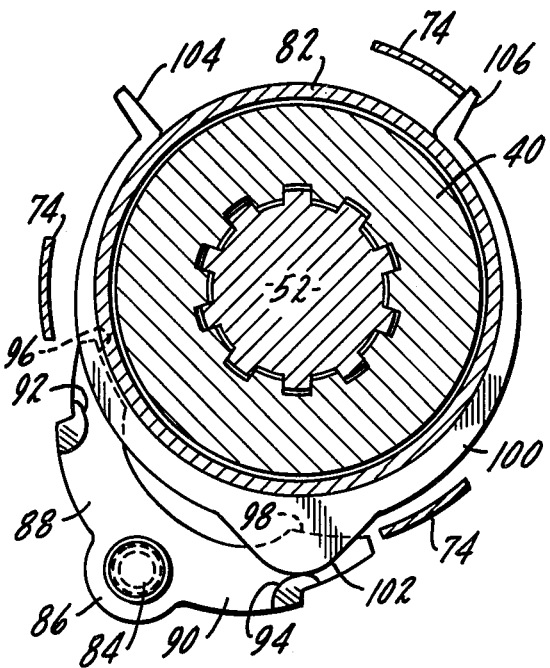
FIG. 8 is a view similar to FIG. 6 showing the blocking structure in another blocking position.

With element 86 in the blocking positions of FIG. 7 or 8, fingers 74 have limited freedom of movement such that cage 68 and rollers 70 are movable between clutch engaging and disengaging positions, but are blocked by element 86 from movement to the opposite clutch engaging position.

While a preferred embodiment of the invention has been shown and described, this should be considered as illustrative and may be modified by those skilled in the art. It is intended that the claims herein cover all such modifications as may fall within the spirit and scope of the invention.

What is claimed is:

1. In power transmission apparatus including a housing, first and second elements supported for rotation in said housing, wedging means subject to displacement between a disengaged position and two positions in wedging engagement with said elements, means for biasing said wedging means toward one of said engaging positions, and means for blocking displacement of said wedging means to the other of said engaging positions; the improvement wherein said blocking means comprises a movable blocking member, and means for moving said blocking member into position to effect said blocking and for reinforcing said biasing of said wedging means toward said one engaging position.

2. The invention of claim 1, said blocking member being rotatable with and movable relative to one of said elements, said moving and reinforcing means being responsive to said rotation of said one element for effecting said movement of said blocking member and said reinforcement of said bias.

3. The invention of claim 2, said moving and reinforcing means including a drag member in frictional engagement with said housing, said wedging means being engageable with said drag member upon said rotation of said one element for effecting said reinforcement of said bias.

4. The invention of claim 2, said moving and reinforcing means including a drag member in frictional engagement with said housing, one of said members defining a cam and the other of said members defining a pair of cam followers, one of said cam followers being engageable with said cam upon said rotation of said one element for effecting said movement of said blocking member.

5. The invention of claim 4, said drag member defining said cam and said blocking member defining said pair of cam followers, said cam followers being spaced from said cam for establishing a lost motion relationship therewith.

6. The invention of claims 4 or 5, said wedging means being engageable with said drag member upon said rotation of said one element for effecting said reinforcement of said bias.

7. The invention of claims 4, 5, or 3, said drag member being spaced from said wedging means for establishing a lost motion relationship therewith, said wedging means being engageable with said drag member upon said rotation of said one element for effecting said reinforcement of said bias.

8. A torque transfer assembly comprising a rotatable input, first and second rotatable outputs, means coupling said input with said first output and including an overrunning clutch having wedging means movable between two positions coupled with said second output and an intermediate position uncoupled from said second output, means for biasing said wedging means toward one of said coupled positions, independent means coupling said outputs, and means operative upon rotation of one of said outputs beyond a predetermined distance for blocking said movement of said wedging means to the other of said coupled positions, said blocking means including a blocking member movable into position for effecting said blocking, and means for moving said blocking member into said blocking position and for reinforcing said biasing of said wedging means.

9. The invention of claim 8, said moving and reinforcing means being responsive to said rotation of said one output for moving said blocking member into said blocking position and for reinforcing said biasing of said wedging means.

10. A torque transfer assembly comprising a housing, an input shaft and front and rear output shafts rotatably supported in said housing, and means in said housing for transferring rotary motion from said input shaft to said output shafts, said transferring means coupling said input shaft with one of said output shafts and including an overrunning clutch coupled with the other of said output shafts, said clutch having first and second elements rotatable with said output shafts and respectively defining first and second clutch races, a roller cage, a plurality of rollers carried by said cage between said clutch races for relative movement between two clutch engaging positions, means biasing said rollers toward one of said clutch engaging positions upon rotation of one of said elements, rotation of said second element faster than said first element tending relatively to move said rollers away from said one engaging position, and means responsive to rotation of one of said elements both for blocking said relative movement of said rollers to the other of said clutch engaging positions and for biasing said rollers toward said one clutch engaging position.

* * * * *